United States Patent [19]

Lin

[11] Patent Number: 5,768,071
[45] Date of Patent: Jun. 16, 1998

[54] SPIN VALVE SENSOR WITH IMPROVED MAGNETIC STABILITY OF THE PINNED LAYER

[75] Inventor: Tsann Lin, Saratoga, Calif.

[73] Assignee: International Business Machines Corporation, Armonk, N.Y.

[21] Appl. No.: 878,886

[22] Filed: Jun. 19, 1997

[51] Int. Cl.⁶ .................................................. G11B 5/39
[52] U.S. Cl. .................................................. 360/113
[58] Field of Search .................................................. 360/113

[56] References Cited

U.S. PATENT DOCUMENTS

| | | | |
|---|---|---|---|
| 5,206,590 | 4/1993 | Dieny et al. | 324/252 |
| 5,301,079 | 4/1994 | Cain et al. | 360/113 |
| 5,343,422 | 8/1994 | Kung et al. | 365/173 |
| 5,373,238 | 12/1994 | McGuire et al. | 324/252 |
| 5,408,377 | 4/1995 | Gurney et al. | 360/113 |
| 5,422,571 | 6/1995 | Gurney et al. | 324/252 |
| 5,442,508 | 8/1995 | Smith | 360/113 |
| 5,465,185 | 11/1995 | Heim et al. | 360/113 |
| 5,475,304 | 12/1995 | Prinz | 324/207.21 |
| 5,668,688 | 9/1997 | Dykes | 360/113 |

OTHER PUBLICATIONS

Hamakawa et al., "Spin–Valve Heads Utilizing Antiferromagnetic NiO Layers", *IEEE Transactions on Magnetics*, 32:1, pp. 149–155, Jan. 1996.

Soeya et al., "Distribution of Blocking Temperature in Bilayered $Ni_{81}Fe_{19}$/NiO Films", *J. Appl. Phys.* 76:(9) pp. 5356–5360, 1 Nov. 1994.

Tan et al., "Exchange Coupling of Sputter Deposited NiCo–O/NiFe Thin Films", *J. Appl. Phys.* 79:(8) pp. 5012–5014, 15 Apr. 1996.

*Primary Examiner*—A. T. Heinz
*Attorney, Agent, or Firm*—Baker Maxham Jester & Meador

[57] ABSTRACT

A multilayered spin valve read head including an antiferromagnetic pinning layer and a ferromagnetic pinned layer which can maintain a high pinning field between the layers while minimizing the coercivity of the pinning layer. The apparatus and method of the invention comprise placing a thin discontinuous nonmagnetic interlayer such as Cu between the antiferromagnetic and the ferromagnetic layers. In one aspect, the invention comprises a supporting substrate or carrier; a first layer of antiferromagnetic material formed over the substrate; a second layer comprising a discontinuous nonmagnetic material formed over the antiferromagnetic first layer; a third layer comprising a ferromagnetic material formed over the discontinuous nonmagnetic material second layer, the first and third layer exhibiting exchange anisotropy which fixes the direction of magnetization of the third layer; a fourth layer comprising a nonmagnetic material formed over the ferromagnetic third layer; and, a fifth layer comprising a ferromagnetic material formed over the nonmagnetic fourth layer.

26 Claims, 8 Drawing Sheets

(ROTATED 90°)

FIG. 8
(ABS)

FIG. 9
(ROTATED 90°)

SPIN VALVE SENSOR WITH IMPROVED MAGNETIC STABILITY OF THE PINNED LAYER

BACKGROUND OF THE INVENTION

1. Field of the Invention

The present invention relates to a spin valve read head and, more particularly, to a spin valve read sensor with improved magnetic stability of a pinned layer.

2. Description of the Related Art

A spin valve sensor is used in a magnetoresistive read head for sensing magnetic fields from a moving magnetic media, such as a magnetic disk or a magnetic tape. A read head employing a spin valve sensor (hereinafter referred to as a "spin valve read head") may be combined with an inductive write head to form a combined magnetic head. The combined magnetic head may have the structure of either a merged head, or a piggyback head.

In a merged head, a single layer serves as a shield for the read head and as a first pole piece for the write head. A piggyback head has a separate layer which serves as the first pole piece for the write head. In a magnetic disk drive, an air bearing surface (ABS) of a combined magnetic head is supported adjacent a rotating disk to write information on or read information from the disk. Information is written to the rotating disk by magnetic fields which fringe across a gap between the first and second pole pieces of the write head. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

Generally, a spin valve sensor includes a nonmagnetic conductive layer—commonly referred to as a spacer layer—sandwiched between first and second ferromagnetic layers. The first and second ferromagnetic layers are commonly referred to as pinned and free layers, respectively. The magnetization of the pinned layer is typically pinned at ninety degrees (90°) to an air bearing surface by exchange coupling to an antiferromagnetic layer. The antiferromagnetic layer is commonly referred to as the pinning layer. The magnetization of the free layer is free to respond to external magnetic fields. First and second leads are connected to the spin valve sensor for conducting a sense current through the spin valve sensor.

The thickness of the spacer layer is chosen to be less than the mean free path of conduction electrons passing through the sensor. Because of this arrangement, a portion of the conduction electrons are scattered by the interfaces of the spacer layer with the pinned and free layers. When the magnetizations of the pinned and free layers are parallel with respect to one another, scattering is minimal and when the magnetization of the pinned and free layers are antiparallel, scattering is maximized. Changes in the scattering of the electrons changes the resistance of the spin valve sensor in proportion to sin θ, where θ is the angle between directions of magnetizations of the pinned and free layers. A spin valve sensor has a very high magnetoresistive (MR) coefficient, substantially higher than an anisotropic magnetoresistive (AMR) sensor. For this reason it is sometimes referred to as a giant magnetoresistive (GMR) sensor.

A large exchange coupling between the antiferromagnetic layer and the pinned layer promotes higher thermal stability of the head. The thermal stability of the head is directly related to the head's blocking temperature. When the head encounters high heat conditions due to electrostatic discharge from an object, or due to contacting an asperity on the magnetic disk, the blocking temperature of the sensor can be exceeded, causing it to lose its directed magnetization. The magnetization of the pinned layer is then no longer pinned in the desired direction.

A typical construction for a spin valve sensor comprises multilayer Ta(5)/NiFe(8)/Cu(2.1)/Co(2.2)/FeMn(15)/Ta(5) (thickness in nanometer) films wherein FeMn is the pinning layer and NiFe is the pinned layer. This sensor has a sheet resistance ($R_S$) of 15.4 ohms per square inch ($\Omega\square$), a giant magnetoresistance coefficient ($\Delta R_G/R_{1000}$) of 5.0%, a ferromagnetic coupling field $H_{FC}$ of 8 oersteds (Oe), and an unidirectional anisotropy pinning field ($H_p$) of 405 Oe. $H_p$ linearly decreases to 146 Oe at a sensor operating temperature of ~120° C., and further decreases toward zero at a blocking temperature of ~180° C. A problem with this spin valve sensor is that the FeMn film is corrosive, making it difficult to incorporate the various films, or layers, into the sensor structure.

Another extensively studied spin value sensor comprises multilayer NiO(40)/NiFe(2)/Co(1)/Cu(2.1)/NiFe(8)/Ta(5) films wherein the NiO is the pinning layer and the NiFe(8) is the pinned layer. This sensor has an $R_S$ of 18.6 $\Omega/\square$, a $\Delta R/R$ of 4.9%, an HFC of 5 Oe, and an $H_p$ beyond 300 Oe. $H_p$ linearly decreases to 169 Oe at a sensor operating temperature of 120° C. Since the NiO film exhibits very high corrosion resistance, it is easier to incorporate the NiO film into the sensor structure. Also, the NiO film's insulating properties will not cause shunting of the sense current during the sensor operation. Furthermore, the NiO/NiFe films have a blocking temperature of ~200° C., making the NiO spin valve sensor attractive for incorporation into the sensor structure. However, a problem with the NiO/NiFe film is that it exhibits a coercivity $H_c$, comparable to its $H_p$. This problem does not exist in the FeMn spin valve sensor, where $H_C$ is much lower than $H_p$. When a high pinning field is maintained, there is a correspondingly high coercivity of the pinned layer which can decrease head sensitivity. The decrease in sensitivity occurs because the magnetic spins at the NiO/NiFe/Co interface cannot return to their original magnetic state after experiencing magnetic excitations.

From the above discussion, it should be apparent that there is a need for a spin valve sensor that can maintain a high pinning field $H_p$ while not exhibiting a correspondingly high coercivity $H_c$ of the pinned layer.

SUMMARY OF THE INVENTION

To overcome the problem of the coercivity $H_c$, increasing with corresponding increases in the pinning field $H_p$, I have discovered an apparatus and method for maintaining a high pinning field $H_p$ between the pinning layer and the pinned layer while eliminating or reducing any increase in the coercivity $H_c$ of the pinned layer. By placing a thin discontinuous nonmagnetic intermediate layer between the antiferromagnetic pinning and the ferromagnetic pinned layers, any increase in the coercivity $H_c$ can be minimized while a high pinning field $H_p$ is maintained.

Generally, the present invention comprises a spin valve sensor having multiple layers. In one incarnation, the invention includes a supporting substrate or carrier; a first layer of antiferromagnetic material formed over the substrate; a second layer comprising a discontinuous nonmagnetic material formed over the antiferromagnetic first layer; a third layer comprising a ferromagnetic material formed over the discontinuous nonmagnetic material second layer, the first and third layer exhibiting exchange anisotropy which fixes the direction of magnetization of the third layer; a fourth layer comprising a nonmagnetic material formed over the ferromagnetic third layer; and, a fifth layer comprising a ferromagnetic material formed over the nonmagnetic fourth layer. The sensor is adapted to receive a source of electrical current. Resistivity to passing the current will vary depending upon the mean-free path of the electrons in the layers. In another incarnation, I found that the second layer comprising the nonmagnetic material does not need to be discontinuous; it may be a continuous nonmagnetic material layer. A spin valve sensor having a nonmagnetic material layer between the antiferromagnetic first layer and the ferromagnetic third layer allows the pinning field $H_p$ between the layers to be maintained at a relatively high level while the coercivity $H_c$ of the adjacent ferromagnetic layer is minimized from what it would have been in the absence of the nonmagnetic material layer.

Other features of the present invention should be apparent from the following description of the preferred embodiment, which illustrates, by way of example, the principles of the invention.

DESCRIPTION OF THE PREFERRED EMBODIMENT

Figure 1:
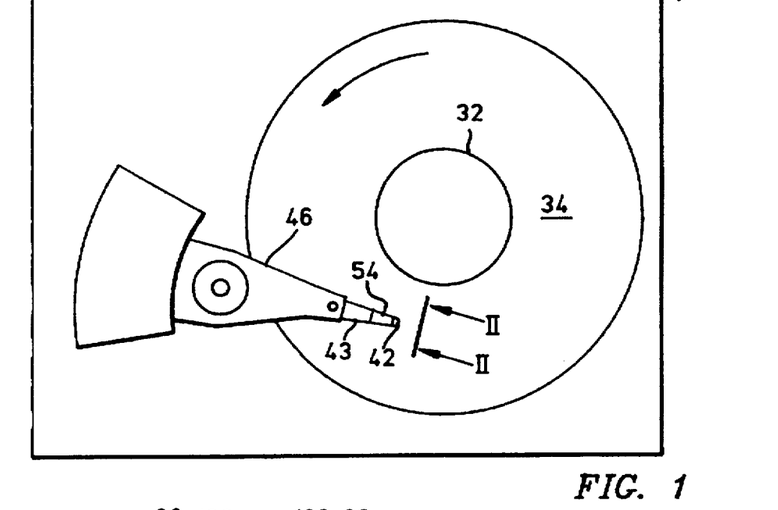
FIG. 1 is a plane view of an exemplary magnetic disk drive that incorporates the present spin valve sensor.
Figure 2:
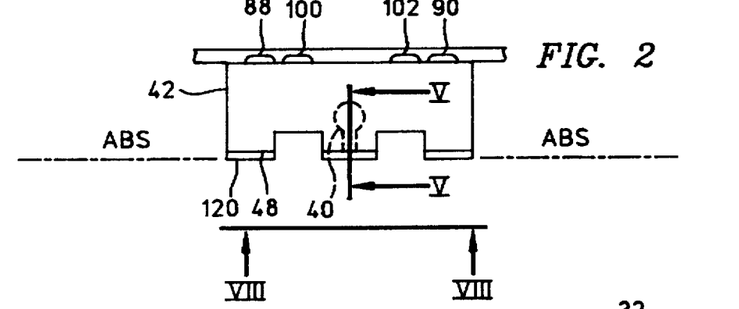
FIG. 2 is an end view of a slider with a magnetic head of the disk drive as seen in plane II—II.
Figure 3:
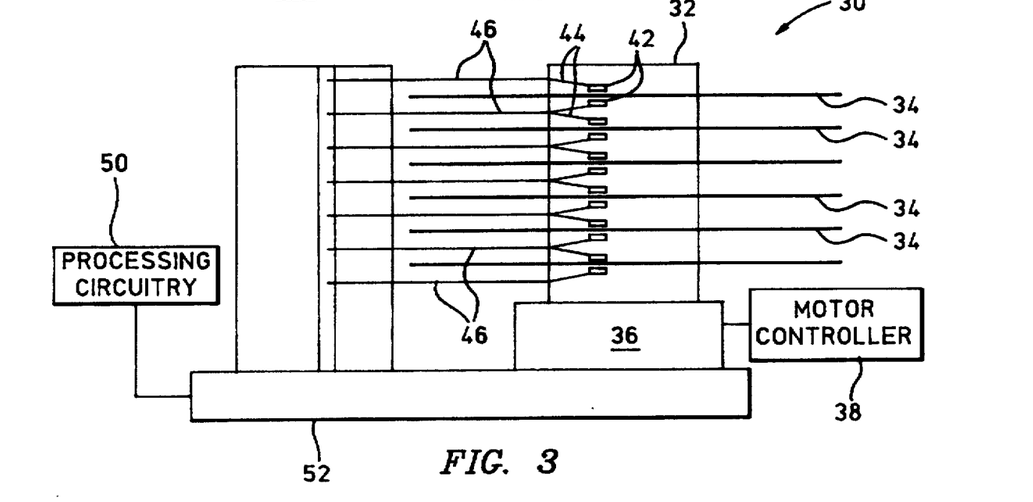
FIG. 3 is an elevation view of the magnetic disk wherein multiple disks and magnetic heads are employed.

Referring now to the drawings wherein like reference numerals designate like or similar parts throughout the several views, there is illustrated in FIGS. 1–3 a magnetic disk drive 30. The drive 30 includes a spindle 32 which supports and rotates a magnetic disk 34. The spindle 32 is rotated by a motor 36 which, in turn, is controlled by a motor controller 38. A horizontal combined magnetic head 40 for reading and recording is mounted on a slider 42 which, in turn, is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 to locate the magnetic head 40 in a transducing relationship with a surface of the magnetic disk 34. When the disk 34 is rotated by the motor 36 the slider is supported on a thin (typically, 0.05 μm) cushion of air (air bearing) between the disk and an air bearing surface (ABS) 48.

Figure 4:
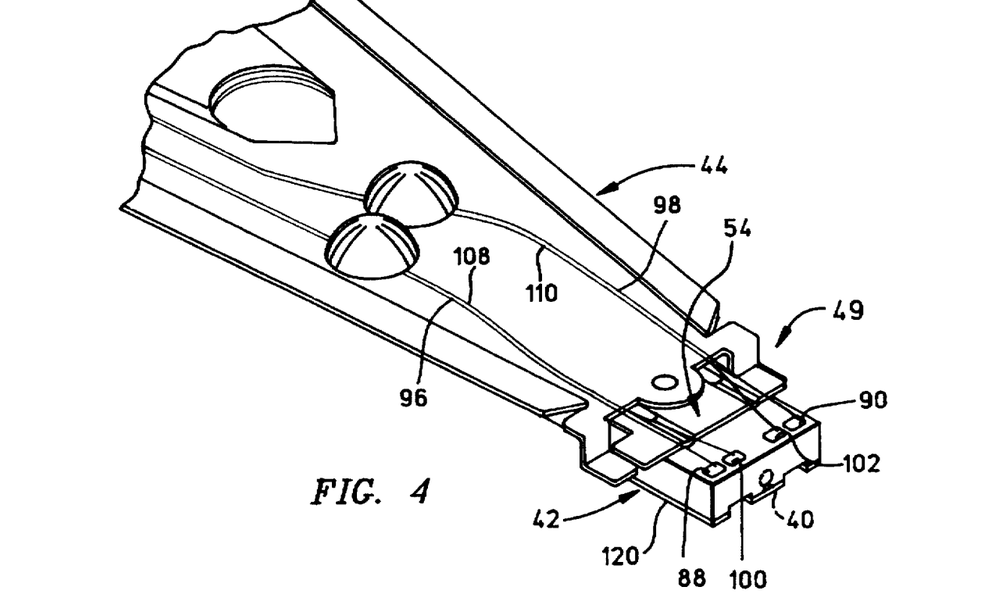
FIG. 4 is an isometric illustration of an exemplary suspension system for supporting a slider and a magnetic head that incorporates the present spin valve sensor.

The magnetic head 40 may then be employed for writing information to multiple circular tracks on the surface of the disk 34, as well as for reading information therefrom. Processing circuitry 50 exchanges signals representing such information with the head 40, provides motor drive signals, and also provides control signals for moving the slider 42 to various tracks. In FIGS. 1 and 4 the slider 42 is shown mounted to a head gimbal assembly (HGA) 49 which in turn is mounted to the suspension 44. All of the above components are supported on a base 52.

Figures 5, 7:
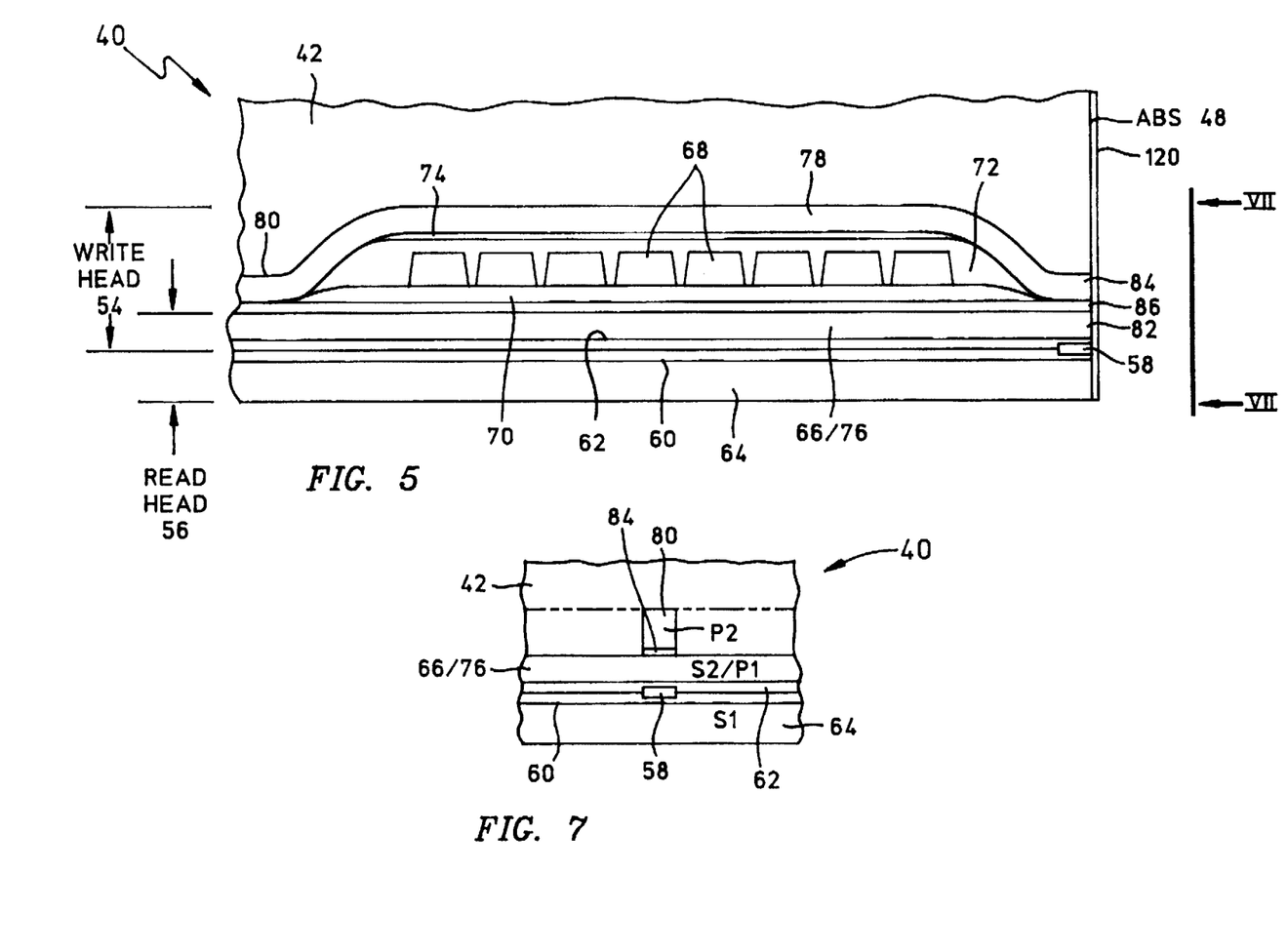
FIG. 5 is a partial view of the slider and magnetic head as seen in plane V—V of FIG. 2.
FIG. 7 is a partial ABS view of the slider taken along plane VII—VII of FIG. 5 to show the read and write components of the magnetic head, the read component incorporating the present spin valve sensor.

FIG. 5 is a side cross-sectional elevation view of a merged magnetoresistive (MR) head 40 which has a write head portion 54 and a read head portion 56, the read head portion employing an MR sensor 58. The MR sensor 58 is sandwiched between first and second gap layers 60 and 62 that are, in turn, sandwiched between first and second shield layers 64 and 66. In response to external magnetic fields, the resistance of the MR sensor 58 changes. A sense current conducted through the sensor causes these resistance changes to be manifested as potential changes which are processed by the processing circuitry 52 shown in FIG. 3.

Figure 6:
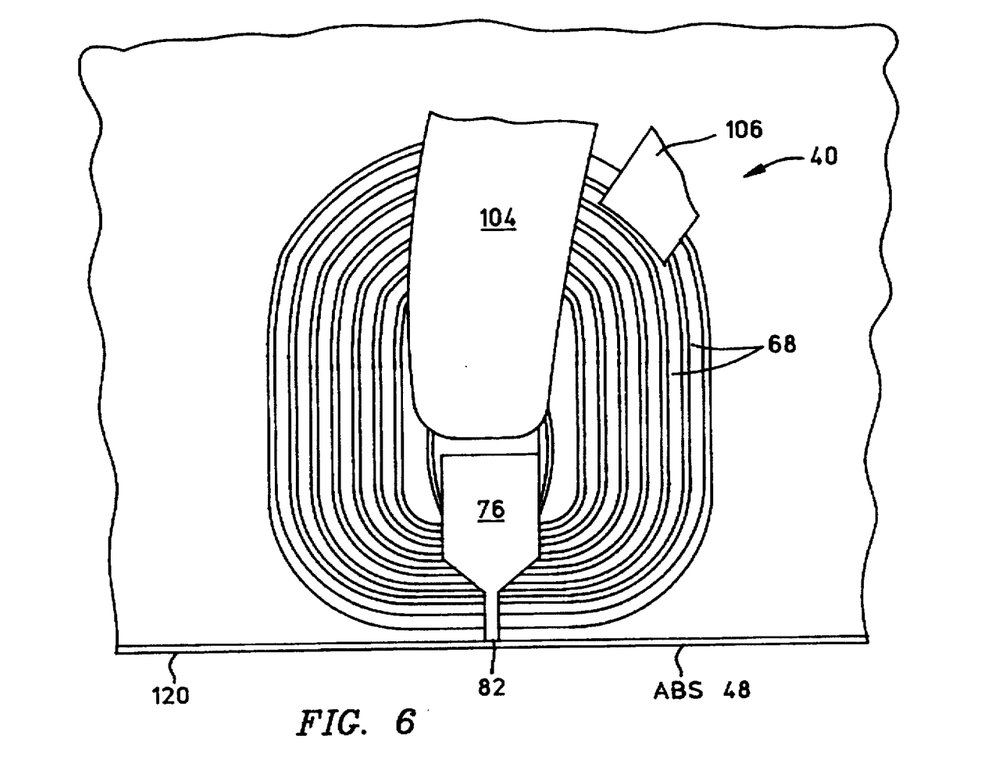
FIG. 6 is a cross-sectional view of the magnetic head as seen in plane VIII—VIII of FIG. 2.

The write head portion 54 of the head includes a coil layer 68 sandwiched between first and second insulation layers 70 and 72. A third insulation layer 74 may be employed for planarizing the head to eliminate ripples in the second insulation layer caused by the coil layer 68. The first, second and third insulation layers are referred to in the art as an "insulation stack". The coil layer 68, and the first, second and third insulation layers 70, 72 and 74 are sandwiched between first and second pole piece layers 76 and 78. The first and second pole piece layers 76 and 78 are magnetically coupled at a back gap 80 and have first and second pole tips 82 and 84 which are separated by a non-magnetic gap layer 86 at the ABS. As shown in FIGS. 2 and 4, first and second solder connections 88 and 90 connect leads (not shown) from the MR sensor 58 to leads 96 and 98 on the suspension 44 and third and fourth solder connections 100 and 102 connect leads 104 and 106 from the coil 64 (see FIG. 6) to leads 108 and 110 on the suspension. An overcoat 120 is shown on the slider 42 covering the sensitive elements 58, 82, 84 and 86 of the magnetic head in FIGS. 2, 4, 5, 6 and 8. An overcoat is required to prevent wear and corrosion of the sensitive elements.

Figure 8:
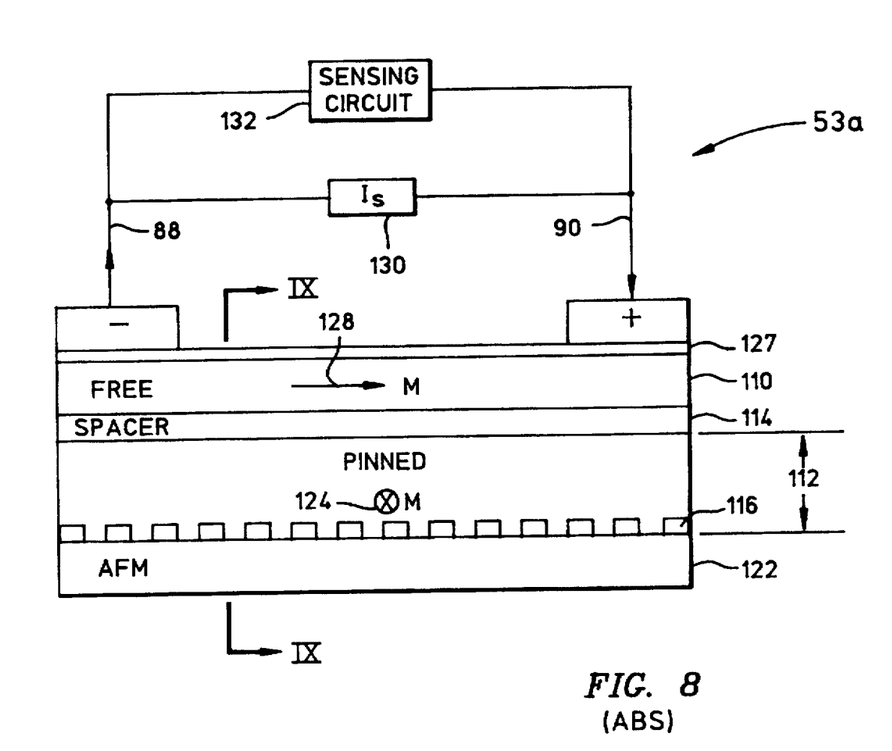
FIG. 8 is an enlarged schematic illustration of the present spin valve sensor of FIG. 6 as seen at an air bearing surface.
Figure 9:
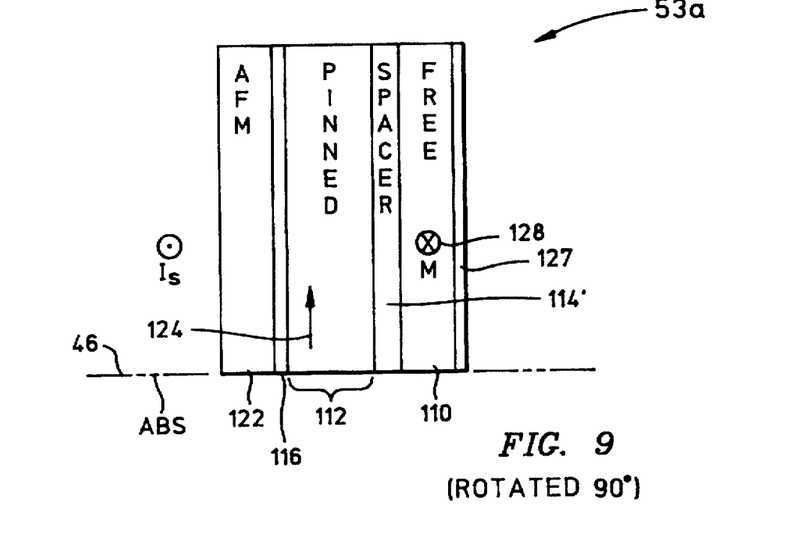
FIG. 9 is a view taken along plane IX—IX of FIG. 8 rotated ninety degrees (90°) clockwise.
Figure 10:
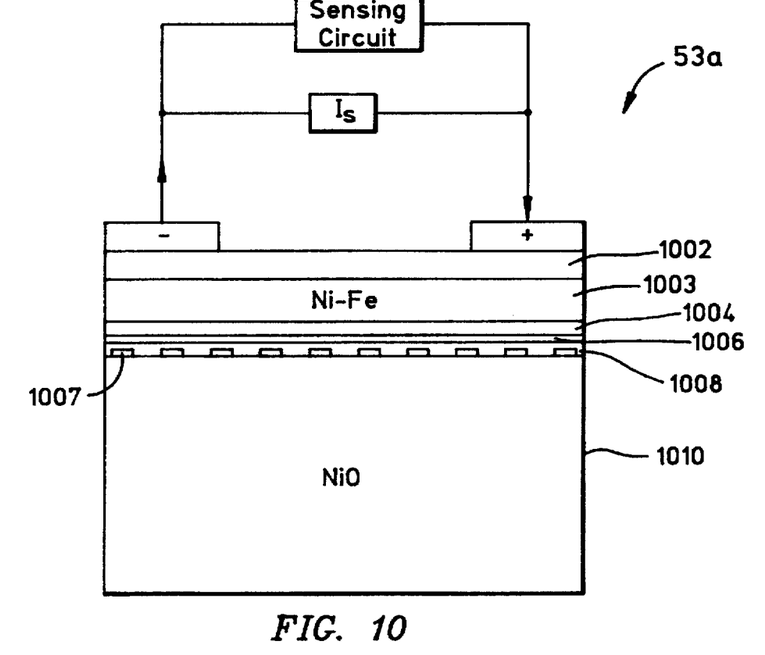
FIG. 10 is a simplified and. enlarged schematic illustration of the embodiment of the present invention shown in FIG. 8. The illustration shows the relative orientations of the various layers.
Figure 11:
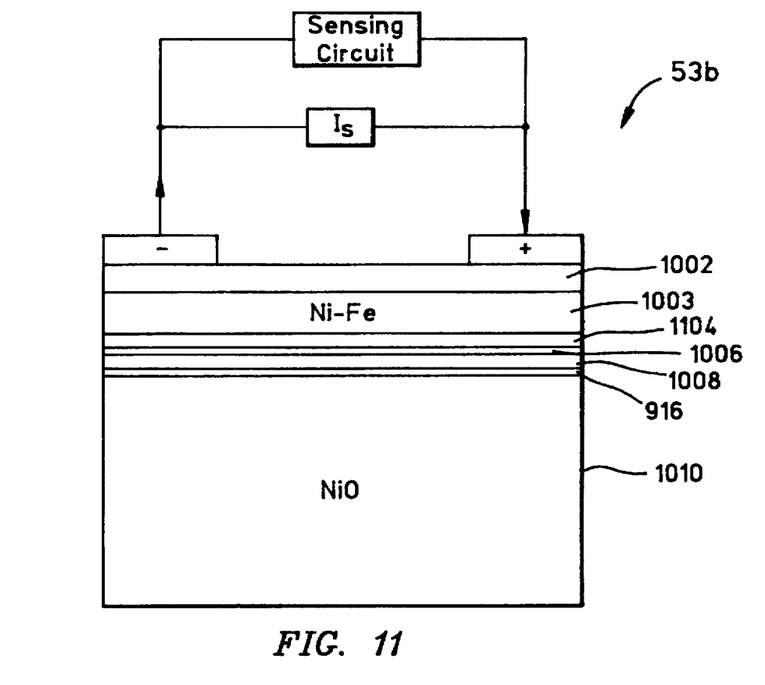
FIG. 11 is a simplified and enlarged schematic illustration of another embodiment of the invention in which a continuous intermediate layer is shown.
Figure 12A:
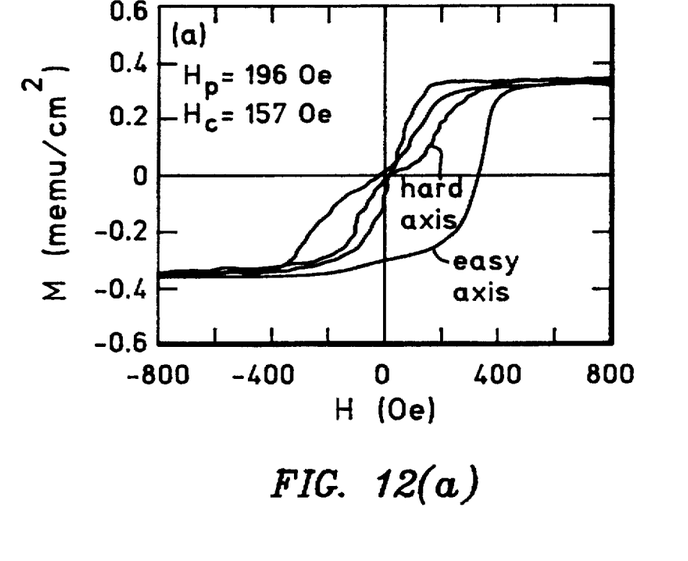
FIG. 12(a) shows the easy- and hard-axis hysteresis loops of a pinning and a pinned layer for a prior art spin valve.
Figure 12B:
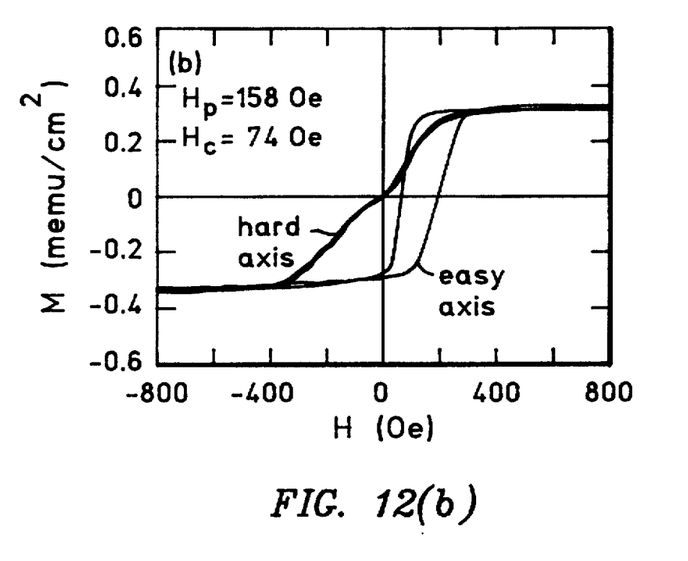
FIG. 12(b) shows the easy- and hard-axis hysteresis loops of a pinning layer, an intermediate layer, and a pinned layer for a spin valve sensor in accordance with one embodiment of the present invention.
Figure 13:
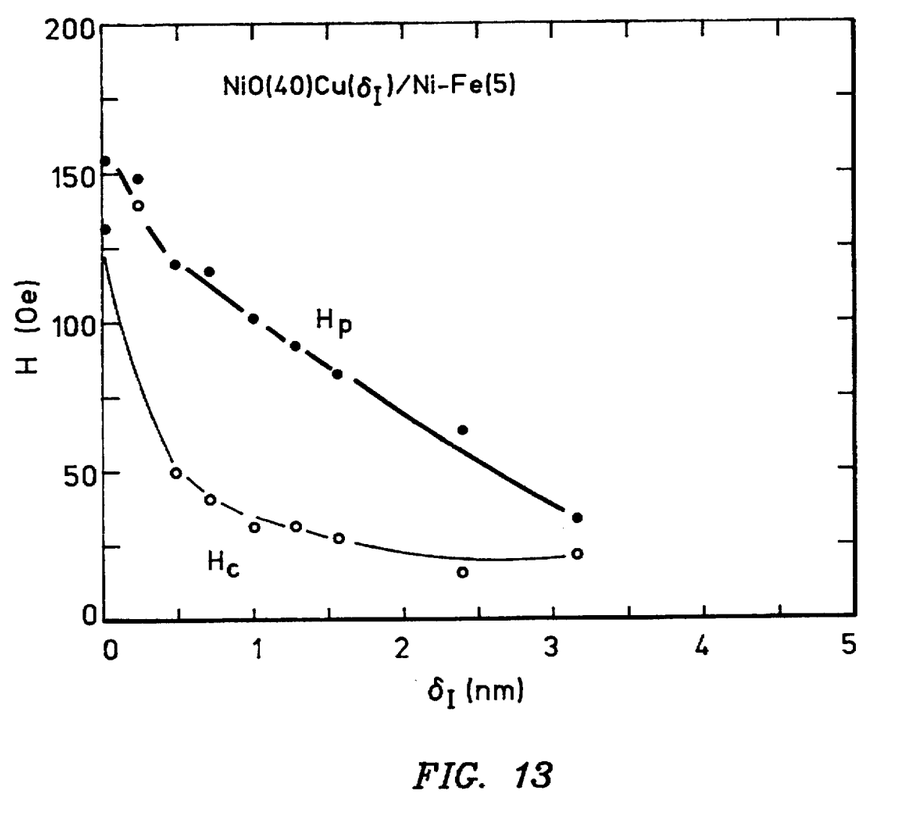
FIG. 13 is a graph showing a relationship of the variations in the unidirectional anisotropy pinning field ($H_p$) and increases in the coercivity of the pinned layer ($H_c$) versus the change of thickness in a Cu interlayer ($\delta_i$) in accordance with one embodiment of the present invention.
Figure 14A:
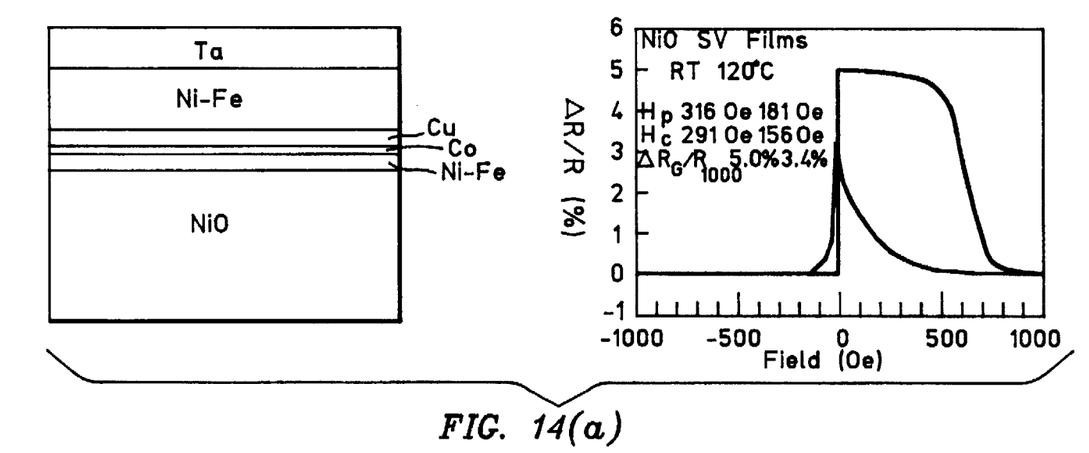
FIG. 14(a) shows a high-field easy axis response for a prior art spin valve sensor.
Figure 14B:
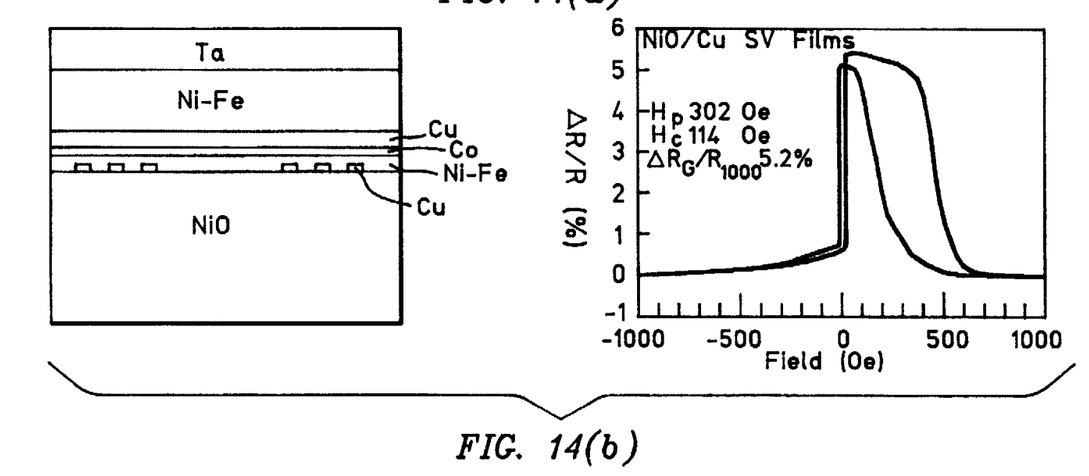
FIG. 14(b) shows a high-field easy axis response for one embodiment of the current invention.

As a result of my investigation I am showing multiple embodiments of a spin valve sensor 53. One embodiment of the present invention, sensor 53a, is shown in FIGS. 8, 9 and 10; another embodiment, sensor 53b, is shown in FIG. 11. Although each embodiment is shown using a NiO antiferromagnetic layer, other common antiferromagnetic materials known to those skilled in the art might be used in its place. For example, CoO or NiMn might be used. In FIGS. 8, 9 and 10 it will be shown how by placing a discontinuous nonmagnetic intermediate layer 116, such as copper (Cu), silver (Ag), or gold (Au), between the antiferromagnetic layer 122 and the ferromagnetic pinned layer 112, the coercivity of the ferromagnetic layer may be minimized while the pinning field of the antiferromagnetic layer is maintained at a high level. In FIG. 11, it will be shown how a continuous nonmagnetic intermediate layer 916 may be used to minimize the coercivity of the ferromagnetic layer in lieu of a discontinuous intermediate layer. The spin valve sensor shown in FIGS. 8, 9 and 10 is the preferred embodiment of the present invention. FIGS. 12–14 explain why the placement of the nonmagnetic intermediate layer shown in FIGS. 8, 9, 10 and 11 result in an improved spin valve sensor.

A sensor 53a shown in FIGS. 8 and 9 has a ferromagnetic free layer 110, a nonmagnetic electrically conductive spacer layer 114, and a pinned ferromagnetic layer 112. A capping layer 127, such as Ta or other commonly used protective material, may cover the free layer 110. A ferromagnetic flux keeper layer may be employed in another embodiment, and may be comprised of materials such as NiFe, NiFeCr, NiFeRh, NiFeNb, or any other alloy having similar performance capabilities. The flux keeper layer preferably covers the capping layer 127. The spacer layer 114 is sandwiched between the free layer 110 and the pinned layer 112. In one embodiment, a ferromagnetic Co layer may be sandwiched between either the free layer 110 and the spacer layer 114, or between the pinned layer 112 and the spacer layer 114. The antiferromagnetic layer 122 abuts the nonmagnetic intermediate layer 116 and pins the magnetization 124 of the pinned layer 112 in a direction perpendicular to the ABS. The nonmagnetic intermediate layer 116 may be very thin, in the order of 0.5 nm, continuous or discontinuous, and does not significantly impede the antiferromagnetic exchange coupling between the antiferromagnetic layer 122 and the pinned layer 112.

The free layer 110 has a magnetization 128 which is free to rotate under the influence of field signals (flux incursions) from the rotating disk 34, these field signals being positive and negative signals which are typically of equal magnitude. A first and second lead 88 and 90, respectively, are electrically connected to the sensor 53a with a space therebetween which defines the active region of the sensor as well as the trackwidth of the read head employing the sensor. A sense current source 130 is electrically connected to the first and second leads 88 and 90 for providing a sense current $I_S$ which is applied to the sensor as shown by the arrows in FIG. 7. In parallel with the sense current source 130 is a sensing circuit 132 for sensing potential changes across the sensor 53a when field signals are induced in the sensor by the rotating disk 34 shown in FIG. 1. The sense current source 130 and the sensing circuit 132 are part of the processing circuitry 48 in FIG. 3.

Each of the layers 110, 112, 114, and 116 conduct the sense current between the first and second leads 88 and 90. A key parameter in the operation of a spin valve sensor is that the spacer layer 114 have a thickness which is less than the mean free path of conduction electrons flowing between the first and second leads 88 and 90. The degree of electron scattering, which depends upon the relative angle between the magnetization 128 of the free layer 110 and the magnetization of the pinned layer 112, determines the resistance of the sensor to the sense current $I_S$. The greatest scattering and the correspondingly greatest increase in resistance occurs when the magnetization 128 and the magnetization of the pinned layer 112 are antiparallel and the least scattering and the correspondingly least resistance change occurs when the magnetization 128 and the magnetization of the pinned layer 112 are parallel with respect to one another.

The magnetization 128 of the free layer 110 is typically oriented parallel to the ABS so that upon receiving positive and negative field signals from a rotating disk the magnetization 128 rotates upwardly or downwardly to decrease or increase the resistance of the sensor. When the magnetization 128 of the free layer 110 is oriented parallel to the ABS the bias point of the transfer curve for the spin valve is located at a zero point.

FIG. 10 shows a simplified illustration of the spin valve sensor 53a shown in FIGS. 8 and 9. The illustration generally indicates the relative physical orientation of each layer used in one embodiment of the current invention. The antiferromagnetic layer 1010 may be considerably thicker than any of the other layers, which include a discontinuous intermediate layer 1007, ferromagnetic layers 1008 and 1006, a spacer layer 1004, a free layer 1003, and a protective top layer 1002. Although each of the layers may be comprised of a suitable material well known to one skilled in the art, the layers preferably comprise a Cu intermediate later 1007, a NiFe layer 1008, a Co layer 1006, a NiFe free layer 1003, a Ta protective layer 1002, a Cu spacer layer 1004, and a NiO antiferromagnetic layer 1010.

The spin valve sensor 53b shown in FIG. 11 is substantially similar to the spin valve sensor 53a shown in FIG. 10. However, a continuous nonmagnetic intermediate layer 916 is used in place of the discontinuous nonmagnetic layer 1007 and is of a generally uniform thickness less than 3.2 nm. In other embodiments of the invention, the continuous nonmagnetic layer 916 may vary in thickness, for example, ranging from an infinitesimal measurement up to 3.2 nm, or being thicker than 3.2 nm.

FIGS. 12(a) and 12(b) are exemplary hysteresis loops for a prior art spin valve sensor and one embodiment of the present invention, respectively, and are shown for the purpose of explaining the impact of placing a nonmagnetic copper layer between the ferromagnetic and antiferromagnetic layers of the current invention. The easy- and hard-axis hysteresis loops of NiO(40)/NiFe(4.2) and NiO(40)/Cu(0.5)/NiFe(4.1) layers are shown in FIGS. 12(a) and 12(b), respectively. M is the measured magnetization per unit area of the pinned layer (memu/cm$^2$). The thickness of the ferromagnetic pinned layer, designated $\delta_p$, is determined by $M/M_S$. As shown, the easy-axis hysteresis loop of the prior art NiO/NiFe layers shows a comparably high pinning field $H_p$ and a comparably high coercivity of the pinned layer $H_C$. The hysteresis loop has a tail end extending from positive to negative fields. In addition, the hard-axis hysteresis loop is open.

The tail end hysteresis behavior can be explained by assuming an ensemble of exchange components at the NiO/NiFe interface, each of which exhibits its own local magnetic field and coercivity. The tail end extending from the positive to the negative fields may be provided by some exchange components exhibiting low local pinning fields $H_p$ but high coercivities $H_C$. The existence of this tail end implies that when the positive field—which is applied in a direction opposite to a pinning field—decreases to zero, magnetic spins in some exchange components cannot return to their original magnetic state.

The present invention assists in returning the exchange components to their original magnetic states. The insertion of a nonmagnetic intermediate layer between the NiO and NiFe films minimizes the $H_C$ of the pinning layer as $H_p$ is maintained at a high level, and virtually eliminates the hysteretic tail. Additionally, the hard-axis hysteresis loop becomes closed. The elimination of the tail indicates that the magnetic spins in some exchange components can return to their original magnetic state when a positive field is applied in the direction opposite to the pinning field. Because the components can return to their original magnetic state, the sensitivity of the read head is maintained. In addition, the blocking temperature of the spin value sensor remains at $-200°$ C. even with the nonmagnetic intermediate layer being placed between the antiferromagnetic pinning layer and the ferromagnetic pinned layer.

As diagramed in FIG. 13, the relationship between $H_p$ and $H_C$ varies proportionally to the thickness $\delta_i$ of the nonmagnetic Cu intermediate layer used in one embodiment of the present invention. For ease of comparison, $H_p$ and $H_C$ have been normalized for a NiFe(5) film based on its $1/\delta_p$ dependence. $\delta_p$ being the thickness of the ferromagnetic pinned layer. The pinning coupling $H_p$ is still reasonably high when the $\delta_p$ of the Cu intermediate layer is as thick as 3.2 nm. This result would surprise one skilled in the art because the exchange coupling between the antiferromagnetic and ferromagnetic layers is an interface phenomenon. This exchange coupling occurs even if a continuous, rather than a discontinuous, intermediate level, such as Cu, is used. As is apparent from FIG. 12(b), the coercivity $H_C$ of the pinned layer decreases more rapidly than the strength of the pinning field $H_p$ as the thickness of the Cu intermediate layer ($\delta_i$) increases.

The diagrams of FIGS. 14(a) and 14(b) show the relationship between the giant magnetoresistive effect versus the net magnetic field affecting a spin valve sensor. FIG. 14(a) illustrates the giant magnetoresistive effect for a prior art spin valve sensor that does not use a nonmagnetic intermediate layer between the ferromagnetic pinned layer and the antiferromagnetic pinning layer. FIG. 14(b) shows the effect of inserting the nonmagnetic layer between the ferromagnetic pinned layers and antiferromagnetic pinning layers in accordance with one embodiment of the present invention. In the figures, the GMR of NiO/NiFe/Co/Cu/NiFe/Ta and NiO/Cu/NiFe/Co/Cu/NiFe/Ta spin valve layers are compared based on nearly identical magnetic fields $H_{FC}$.

The thin nonmagnetic Cu intermediate layer used in one embodiment of the present invention and shown in FIG. 14(b) may exist in the form of clusters sputtered over the NiO layer, thereby increasing the surface roughness of the NiO, and thusly increasing $H_{FC}$. A thicker more continuous nonmagnetic spacer layer may thus be selected to reduce $H_{FC}$. The comparison indicates that the NiO/Cu/NiFe/Co/Cu/NiFe/Ta layers have a lower $H_C$ and higher giant magnetoresistive ($\Delta R/R$). As shown and as known to one skilled in the art, a $\Delta R/R$ of 5.2% is quite high for an $H_{FC}$ of as low as 7.8 Oe. This $\Delta R/R$ has been found to further increase as $H_{FC}$ increases. Furthermore, as the thickness of the Cu intermediate layer increases, the GMR coefficient will further increase to 6.1% while $H_c$, decreases to 136 Oe. The Cu intermediate layer is also suitable for many prior art NiO spin valve sensors, such as sensors where demagnetizing fields are cancelled either by using antiparallely coupled Co/Ru/Co layers as pinned layers, or by using a flux keeper layer.

Exemplary materials for the spin valve sensors 53a and 53b are NiFe for the free layer 110, Cu for the spacer layer 114, Co, NiFe, NiFe/Co for the pinned layer 112, Cu for the intermediate layer 116, and Ta for the capping layer 127. NiO is preferred for the antiferromagnetic pinning layer 122, although other materials interacting similarly with the nonmagnetic layer 116 and the pinning layer 112, as well as spacer layer 114 and the free layer 110, may be used. For example, cobalt oxide, nickel oxide, iron oxide, iron sulfide, iron manganese, or oxide solutions thereof, amongst others, may suffice. The intermediate layer 116 may alternatively comprise Au, Ag, or other nonferromeagnetic material having high conductivity.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetoresistive spin valve read sensor, comprising:
   a ferromagnetic free layer having a magnetization which is free to rotate in upward and downward directions upon sensing positive and negative magnetic incursions, respectively;
   a ferromagnetic pinned layer;
   an antiferromagnetic pinning layer adjacent said pinned layer and having a pinning field which pins a magnetization of the pinned layer in a transverse direction perpendicular to an air bearing surface;
   a nonmagnetic intermediate layer sandwiched between the pinned layer and the pinning layer;
   an electrically conductive nonmagnetic spacer layer sandwiched between the free layer and the pinned layer so that, upon sensing said positive and negative magnetic incursions, the magnetization of the free layer rotates in said upward and downward direction from said transverse direction, thus causing an increase or decrease in magnetoresistance, respectively; and
   a sense current source means connected to the spin valve sensor for applying a sense current through the sensor, the sensor manifesting voltage changes in response to said increase or decrease in magnetoresistance.

2. The sensor as claimed in claim 1, wherein the nonmagnetic intermediate layer affects the coercivity of the pinned layer from increasing as much in response to an increase in the magnetization as would occur in the absence of the intermediate layer.

3. The sensor as claimed in claim 1, further comprising:
   an air bearing surface, wherein the sensor is in a quiescent state when the sense current is applied but no magnetic incursion is received from said magnetic medium;
   the pinned direction being perpendicular to the ABS;
   the magnetization of the free layer being parallel to the ABS when the sensor is in said quiescent state.

4. The sensor as claimed in claim 1 wherein the nonmagnetic layer sandwiched between the pinned layer and the pinning layer decreases the coercivity of the pinned layer much more substantially than a unidirectional anisotropy field.

5. The sensor as claimed in claim 1, wherein the nonmagnetic layer sandwiched between the pinned layer and the pinning layer comprises a plurality of discontinuous segments.

6. The sensor as claimed in claim 5 wherein the nonmagnetic layer sandwiched between the pinned layer and the pinning layer decreases the coercivity of the pinned layer much more substantially than a unidirectional anisotropy field.

7. The sensor as claimed in claim 6, wherein a ferromagnetic flux keeper layer is used.

8. The sensor as claimed in claim 5, wherein the nonmagnetic intermediate layer affects the coercivity of the pinned layer from increasing as much in response to an increase in the magnetization as would occur in the absence of the intermediate layer.

9. A magnetic head comprising:
   a write head including:
      at least one coil layer and an insulation stack;
      the coil layer being embedded in the insulation stack;
      first and second pole pieces connected at a back gap and having pole tips with edges forming a portion of an air bearing surface (ABS);
      the insulation stack being sandwiched between the first and second pole pieces; and
      a write gap layer sandwiched between the pole tips of the first and second pole pieces and forming a portion of the ABS;
   a read head including:
      first and second gap layers and first and second shield layers;
      a spin valve sensor, the spin valve sensor being sandwiched between the first and second gap layers and the first and second gap layers being sandwiched between the first and second shield layers, the spin valve sensor including:
         a ferromagnetic free layer having a magnetization which is free to rotate in first and second directions upon sensing said positive and negative magnetic incursions, respectively;
         a ferromagnetic pinned layer;
         an antiferromagnetic pinning layer adjacent said pinned layer which pins a magnetization of the pinned layer along a pinned direction;
         a nonmagnetic intermediate layer sandwiched between the pinned layer and the pinning layer;
         an electrically conductive nonmagnetic spacer layer sandwiched between the free layer and the pinned layer so that, upon sensing said positive and negative magnetic incursions, the magnetization of the free layer rotates in said first and/or second direction from said pinned direction of the magnetization of the pinned layer, thus causing an increase or decrease in magnetoresistance, respectively; and
         a sense current source means connected to the spin valve sensor for applying a sense current through the sensor, the sensor manifesting voltage changes in response to said increase or decrease in magnetoresistance.

10. The sensor as claimed in claim 9, further comprising:
   an air bearing surface, wherein the sensor is in a quiescent state when the sense current is applied but no magnetic incursion is received from said magnetic medium;
   the pinned direction being perpendicular to the ABS;
   the magnetization of the free layer being parallel to the ABS when the sensor is in said quiescent state.

11. The sensor as claimed in claim 10 wherein the nonmagnetic layer sandwiched between the pinned layer and the pinning layer decreases the coercivity of the pinned layer much more substantially than a unidirectional anisotropy field.

12. The sensor as claimed in claim 10, wherein the nonmagnetic intermediate layer affects the coercivity of the pinned layer from increasing as much in response to an increase in the magnetization as would occur in the absence of the intermediate layer.

13. The sensor as claimed in claim 9, wherein the nonmagnetic layer sandwiched between the pinned layer and the pinning layer comprises a plurality of discontinuous segments.

14. The sensor as claimed in claim 13, further comprising:
   an air bearing surface, wherein the sensor is in a quiescent state when the sense current is applied but no magnetic incursion is received from said magnetic medium;
   the pinned direction being perpendicular to the ABS;
   the magnetization of the free layer being parallel to the ABS when the sensor is in said quiescent state.

15. The sensor as claimed in claim 13 wherein the nonmagnetic layer sandwiched between the pinned layer and the pinning layer decreases the coercivity of the pinned layer much more substantially than a unidirectional anisotropy field.

16. The sensor as claimed in claim 15, wherein a ferromagnetic flux keeper layer is used.

17. The sensor as claimed in claim 13, wherein the nonmagnetic intermediate layer affects the coercivity of the pinned layer from increasing as much in response to an increase in the magnetization as would occur in the absence of the intermediate layer.

18. A magnetic disk drive comprising:
   a write head including:
      at least one coil layer and an insulation stack;
      the coil layer being embedded in the insulation stack;
      first and second pole pieces connected at a back gap and having pole tips with edges forming a portion of an air bearing surface (ABS);
      the insulation stack being sandwiched between the first and second pole pieces; and
      a write gap layer sandwiched between the pole tips of the first and second pole pieces and forming a portion of the ABS;
   a read head including:
      an spin valve sensor;
      first and second gap layers and first and second shield layers; and
      the spin valve sensor being sandwiched between the first and second gap layers and the first and second gap layers being sandwiched between the first and second shield layers, the spin valve sensor including:
         a ferromagnetic free layer having a magnetization which is free to rotate in first and second directions upon sensing said positive and negative magnetic incursions, respectively;
         a pinned layer;
         an antiferromagnetic pinning layer adjacent said pinned layer which pins a magnetization of the pinned layer along a pinned direction;
         a nonmagnetic intermediate layer sandwiched between the pinned layer and the pinning layer;
         an electrically conductive nonmagnetic spacer layer sandwiched between the free layer and the pinned layer so that, upon sensing said positive and negative magnetic incursions, the magnetization of the free layer rotates in said first and/or second direction from said pinned direction of the magnetization of the pinned layer, thus causing an increase or decrease in magnetoresistance, respectively; and a sense current source means connected to the spin valve sensor for applying a sense current through the sensor, the sensor manifesting voltage changes in response to said increase or decrease in magnetoresistance;

the write head and the read head being adjacent one another to form a combined magnetic head;

a frame;

a magnetic disk rotatably supported on the frame;

a support mounted on the frame for supporting the head in a transducing relationship with the magnetic disk;

means for rotating the magnetic disk;

positioning means connected to the support for moving the combined magnetic head to multiple positions with respect to said magnetic disk; and means connected to the combined magnetic head, to the means for rotating the magnetic disk and to the positioning means for exchanging signals with the combined magnetic head, for controlling movement of the magnetic disk and for controlling the position of the combined magnetic head.

19. The sensor as claimed in claim 18, wherein the nonmagnetic layer sandwiched between the pinned layer and the pinning layer comprises a plurality of discontinuous segments.

20. The sensor as claimed in claim 19, further comprising:

an air bearing surface, wherein the sensor is in a quiescent state when the sense current is applied but no magnetic incursion is received from said magnetic medium;

the pinned direction being perpendicular to the ABS;

the magnetization of the free layer being parallel to the ABS when the sensor is in said quiescent state.

21. The sensor as claimed in claim 19, wherein the nonmagnetic intermediate layer affects the coercivity of the pinned layer from increasing as much in response to an increase in the magnetization as would occur in the absence of the intermediate layer.

22. The sensor as claimed in claim 18, further comprising:

an air bearing surface, wherein the sensor is in a quiescent state when the sense current is applied but no magnetic incursion is received from said magnetic medium;

the pinned direction being perpendicular to the ABS;

the magnetization of the free layer being parallel to the ABS when the sensor is in said quiescent state.

23. The sensor as claimed in claim 22, wherein the nonmagnetic intermediate layer affects the coercivity of the pinned layer from increasing as much in response to an increase in the magnetization as would occur in the absence of the intermediate layer.

24. The sensor as claimed in claim 22 wherein the nonmagnetic layer sandwiched between the pinned layer and the pinning layer decreases the coercivity of the pinned layer much more substantially than a unidirectional anisotropy field.

25. The sensor as claimed in claim 18 wherein the nonmagnetic layer sandwiched between the pinned layer and the pinning layer decreases the coercivity of the pinned layer much more substantially than a unidirectional anisotropy field.

26. The sensor as claimed in claim 1, wherein a ferromagnetic flux keeper layer is used.

* * * * *